United States Patent [19]

Toulhoat et al.

[11] Patent Number: 4,902,662

[45] Date of Patent: Feb. 20, 1990

[54] PROCESSES FOR PREPARING AND REGENERATING A COPPER CONTAINING MERCURY COLLECTING SOLID MASS

[75] Inventors: Hervé Toulhoat, Houilles; Michel Roussel, Antony; Philippe Varin, Massy, all of France

[73] Assignee: Institut Francais du Petrole, Rueil-Malmaison, France

[21] Appl. No.: 198,792

[22] Filed: May 25, 1988

[30] Foreign Application Priority Data

May 26, 1987 [FR] France .............................. 87 07442
May 26, 1987 [FR] France .............................. 87 07443

[51] Int. Cl.$^4$ .................... B01J 27/04; B01J 20/08; B01D 53/14; B01D 15/06
[52] U.S. Cl. ................................. 502/216; 55/72; 55/74; 210/660; 423/99; 502/31; 502/34; 502/60; 502/84; 502/168; 502/400; 502/407; 502/410; 502/415; 502/417
[58] Field of Search ............... 502/216, 168, 184, 400, 502/407, 410, 415, 417

[56] References Cited

U.S. PATENT DOCUMENTS 3,408,291 10/1968 Thomas et al. .
4,094,777 6/1978 Sugier et al. .
4,474,896 10/1984 Chao .
4,530,917 7/1985 Berrebi .............................. 502/216
4,719,195 1/1988 Toulhoat et al. ................... 502/216

*Primary Examiner*—Paul E. Konopka
*Attorney, Agent, or Firm*—Millen, White & Zelano

[57] ABSTRACT

The invention relates to a process for preparing a mercury collecting solid mass containing a carrier and copper, at least partly as copper sulfide, comprising the following steps of:

(a) incorporating with the carrier at least one copper compound other than a sulfide,
(b) optionally roasting said carrier,
(c) incorporating therewith at least one organic polysulfide, and
(d) thermally treating the resultant mass, in non-oxidizing atmosphere, under gas scavenging.

The invention also concerns a regenerating process for a mercury recovery mass, containing a carrier, and copper, at least partly as copper sulfide, comprising incorporating with said mass, after a decrease of its mercury recovery efficiency and after removal of at least a part of its mercury content, an organic polysulfide, and finally subjecting it to a thermal treatment, in non-oxidizing atmosphere, under gas scavenging.

15 Claims, No Drawings

PROCESSES FOR PREPARING AND REGENERATING A COPPER CONTAINING MERCURY COLLECTING SOLID MASS

The present invention concerns a process for the preparation of a mercury collecting solid mass containing an inorganic carrier and copper, at least partly as copper sulfide, as well as a process for regenerating said solid mass.

The invention further concerns a process for the preparation of a mercury collecting solid mass precursor.

The solid masses prepared according to the invention may be called equally absorption, collecting, recovery, extraction or trapping masses.

BACKGROUND OF THE INVENTION

U.S. Pat. No. 4,094,777 discloses a process for the preparation of a mercury recovery mass comprising the incorporation of a copper compound with an inorganic carrier, followed by a sulfurization step at a temperature lower than 300° C.

The sulfurization step of the process disclosed in this patent is performed by means of a gaseous agent, for example hydrogen sulfide, or of a solution of inorganic sulfide in water or in an organic solvent, for example an aqueous solution of sodium sulfide, potassium sulfide or ammonium sulfide.

The obtained masses have a high activity and are rather inexpensive. However, the preparation of said recovery masses suffers from several serious disadvantages.

For example, when the sulfurization is performed by means of gaseous hydrogen sulfide ($H_2S$), to obtain a recovery mass of sufficient activity, it is usually necessary to proceed at relatively high temperatures, for example example higher than 200° C., which is disadvantageous. Moreover, $H_2S$ is a toxic and malodorous product.

By using sulfur solutions, for example aqueous solutions of ammonium sulfide, it is possible to operate at a relatively low temperature, for example between 0° and 100° C. However ammonium sulfide is toxic and decomposes easily, which makes its use very difficult.

The mercury recovery efficiency of the masses obtained by this process decreases with time and their lifetime is limited.

SUMMARY OF THE INVENTION

It has been surprisingly discovered that a mercury recovery solid mass of high efficiency and improved lifetime can be obtained by using as the sulfurization agent an organic polysulfide of general formula R—$S_{(n)}$—R' wherein R, R' and n are as defined hereinafter.

The incorporation of said sulfurizing agent, at least partially with an inorganic carrier, preferably at least partly in the pores thereof, provides a precursor of mercury recovery solid mass. Said precursor is then treated in a non-oxidizing, for example neutral or reducing, preferably neutral, atmosphere, usually under gas scavenging at a sufficient temperature and for a sufficient time to obtain the formation of copper sulfide and optionally the sulfides of other metals, if any, present in the inorganic carrier.

The process for preparing the mercury recovery solid mass according to the invention, said mass having better efficiency over time, also has the following advantages:

- the possibility of incorporating the sulfurizing agent at a relatively low temperature, usually lower than 100° C.,
- the possibility of converting the mercury recovery mass precursor resulting from the incorporation of organic polysulfide to an active recovery mass at a relatively low temperature, usually lower than 250° C., and
- the use of a non-toxic sulfurization agent without any bad smell.

More precisely, the process for preparing a mercury recovery solid mass according to the present invention comprises the following steps:

(a) incorporating at least one copper compound other than a sulfide with a solid inorganic carrier or dispersing agent, (b) optionally roasting the product obtained in step (a) so as to convert at least partly the one or more copper compounds(s) contained therein to copper oxide (CuO), (c) at least partly incorporating at least one organic polysulfide of formula R—$S_{(n)}$—R' with the product resulting from step (b) or with the product resulting from step (a), and (d) subjecting the precursor obtained in step (c) to thermal treatment in a non-oxidizing atmosphere, under gas scavenging, at a sufficient temperature and for a sufficient time to form the sulfide of the one or more present metal(s).

The solid inorganic carriers or dispersing agents are usually selected from the group formed of coal, active carbon, coke, silica, silica carbide, silica gel, natural or synthetic silicates, clays, diatomaceous earths, fuller's earths, kaolin, bauxite, a refractory inorganic oxide such as alumina, titanium oxide, zirconia, magnesia, silica-aluminas, silica-magnesias and silica-zirconias, alumina-boron oxide mixtures, aluminates, silico-aluminates, alumino-silicate crystalline zeolites, synthetic or natural, for example mordenites, faujasites, offretites, erionites, ferrierites, ZSM5 and ZSM11 zeolites, mazzites, and cements such as those of the Secar type produced by Lafarge company.

The carrier is generally selected from the group consisting of coal, active carbon, coke, silica, aluminas, silica-aluminas, silicates, aluminates and silico-aluminates.

It is advantageously selected from the group formed of silica, aluminas, silica-aluminas, silicates, aluminates and silico-aluminates, and more preferably consists of alumina.

When the mercury recovery masses are used in the treatment of charges containing condensable hydrocarbons (for example of 4 carbon atoms or more) at a temperature within the temperature range at which the recovery is performed, it has been observed that the masses having an average pore diameter of at least 100 Angströms have a higher stability.

The conditions for obtaining masses (or carriers for producing said masses) having an average pore diameter of at least 100 Angströms are well known in the art (see for example U.S. Pat. No. 4,094,777) and need not be repeated here.

The preferred carriers generally have a specific surface from 20 to 300 $m^2$ ($g^{-1}$), these values not being limitative.

The incorporation of a copper compound other than a sulfide with a solid inorganic carrier or dispersing agent may be performed according to any method known in the art, for example by mixture with a copper compound or by impregnation with a copper compound solution. These copper compounds are usually easy to convert to copper oxide at relatively low temperatures.

Non-limitative examples of copper compounds are: copper oxides, copper hydroxide $Cu(OH)_2$, copper basic salts, particularly carbonates of formulas $CuCO_3$, $Cu(OH)_2$ and $2CuCO_3$, $Cu(OH)_2$, copper salts and organic complexes such as copper salts of carboxylic acids, for example copper formiates, acetates, tartarates, citrates, benzoates, oxalates, malonates, succinates, glycolates, lactates, acetylacetonate and nitrate.

The copper compound is preferably introduced by impregnating the carrier with an organic or, preferably, an aqueous solution of a copper compound. A copper nitrate aqueous solution is advantageously used.

Optionally, a small proportion of a silver soluble compound may be introduced onto the carrier. The silver amount introduced, expressed as silver weight, generally amounts to 0-5% by weight in proportion to the carrier. Other metals, such as iron and lead, may also be present.

The solid inorganic carrier or dispersing agent comprising a copper compound other than a sulfide is then optionally roasted so as to convert, at least partly, the copper compound to copper oxide. This roasting step is usually unnecessary when in step (a) of introducing a copper compound, a copper oxide for example has been admixed with the solid inorganic carrier or dispersing agent.

During this roasting step, the operating conditions are preferably so selected as to convert at least a major part, i.e., at least 50%, preferably at least 80% and advantageously 100% of the copper compound, to copper oxide (CuO). The roasting step may be conducted in neutral or oxidizing atmosphere, for example in the presence of an inert gas such as nitrogen, argon, helium or a mixture of these gases, or in the presence of an oxygen-inert gas mixture of 1-60% oxygen wt content or even in the presence of substantially pure oxygen.

The roasting step is preferably conducted in an oxidizing atmosphere, advantageously in air, and optionally in air of increased oxygen content.

The roasting temperature is usually from about 200° to about 1000° C., preferably from about 300° to about 800° C. and advantageously from about 350° to about 600° C.

The roasting step may be conducted in a static atmosphere or in a gas stream. Usually, it is preferred to use a gas stream, advantageously in air stream. The hourly space velocity (VVH), expressed as gas volume per volume of recovery mass and per hour, is usually from 0 to about 20 000 $h^{-1}$, preferably from 100 to 10 000 $h^{-1}$ and most preferably from about 300 to 5 000 $h^{-1}$.

The roasting step usually lasts from about 0.5 to about 24 hours, preferably from about 0.5 to about 12 hours and advantageously from about 1 hour to about ;b 10 hours.

The product originating from roasting step (a) or (b), usually containing copper oxide, is then contacted with at least one organic polysulfide so as to at least partially incorporate said compound or sulfurization agent to the solid inorganic carrier or dispersing agent, the product resulting from said incorporation step (c) forming the precursor of the mercury recovery mass according to the invention.

The sulfurization agent used in the process of the invention is an organic polysulfide of general formula $R-S_{(n)}-R'$ wherein n is an integer from 2 to 20, preferably from 3 to 20 and usually from 3 to 8, more particularly from 4 to 7; R and R' are each an organic radical, identical or different, containing 1-150 carbon atoms, preferably 10-60, more preferably 5-40 and advantageously 7-16 carbon atoms, these radicals being usually selected from the group consisting of saturated or unsaturated, linear or branched alkyl radicals or radicals of naphthenic type, aryl radicals, alkylaryl and arylalkyl radicals, these various radicals optionally comprising a heteroatom, R optionally also being a hydrogen atom.

The organic polysulfide is usually incorporated at a temperature lower than 100° C., generally from about 0° to 50° C., preferably about 10°-35° C., for example at room temperature (usually about 20° C. or 15°-25° C.). The polysulfide is generally used as solution in an adequate organic solvent, which depends on its nature. This solvent may be an ether, an ester, a ketone, a hydrocarbon or a mixture of two or more of these compounds.

Generally, a hydrocarbon or hydrocarbon mixture is used, such as:

- a light gasoline boiling for example between about 60° and 95° C.,
- a hexane gasoline boiling between about 63° and 68° C.,
- a an F gasoline boiling between about 100° and 160° C. and usually containing by volume 10-20%, for example 15% of aromatic hydrocarbons,
- a "white spirit" gasoline type, boiling between about 150° and 250° C. and usually containing by volume 14-22%, for example 17%, of aromatic hydrocarbons, or
- any cut with or without hydrocarbons, equivalent to the preceding gasolines.

An example of a preferred organic polysulfide is ditert-dododecylpolysulfide (n=5) wherein each of R and R' is a dodecyl radical.

This product is sold for example by Elf Aquitaine Company under reference TPS 32, indicating its sulfur content of about 32% by weight.

Another example is ditert-nonylpolysulfide (n=5) wherein each of R and R' is a nonyl radical.

This product is sold by Elf Aquitaine Company under reference TPS 37, since it contains about 37% by weight of sulfur, or by PENWALT Company under reference TNPS.

Depending on the operating conditions, these organic polysulfide sulfurization agents may be used alone or in combination.

The amount of polysulfide incorporated with the absorption mass is selected so as to enable subsequent conversion of the copper compounds contained in said mass at least partly to copper sulfide. The amount of polysulfide may be easily adjusted in accordance with the desired amount of copper sulfide to be obtained.

It is usually desirable to convert the total amount of copper compounds present in the absorption mass to copper sulfide and hence to use a polysulfide amount, calculated in terms of sulfur atoms, in a substantially stoichiometrical proportion with respect to copper or to the totality of copper and other existing metals, particularly silver, calculated as metal atoms.

The organic polysulfide is preferably used in such an amount, calculated as sulfur atoms, that the atomic ratio of sulfur to the metals present in the mass be about from 0.7:1 to 1.2:1 and preferably from about 0.8:1 to 1.1:1.

The precursor resulting from step (c) of incorporating a sulfurization agent with the solid inorganic carrier or dispersing agent is then subjected to a thermal treatment in a non-oxidizing, for example neutral or reducing, preferably neutral atmosphere, under gas scavenging, at a sufficient temperature and for a sufficient time to form the sulfide of the one or more involved metal(s).

This thermal treatment is usually conducted under a stream of inert gas, for example nitrogen, argon, helium, steam or a mixture of two or more of these gases.

In a preferred embodiment of this thermal treatment under gas scavenging, a water steam-containing gas and at least one other inert gas such as nitrogen, argon and helium are used. The proportion of steam in the gas mixture is advantageously at least 50% by weight. It is often preferable to use steam alone, undiluted with another inert gas.

Thus, according to an advantageous embodiment of this treatment, the organic polysulfide-containing absorption mass is treated in a gas stream preferably containing steam, at a temperature from about 100° to about 250° C., preferably from about 110° to 180° C. and advantageously from about 120° to 150° C., with an hourly space velocity (VVH), expressed as gas volume per volume of recovery mass and per hour, from about 100 to 10,000 $h^{-1}$, preferably from about 300 to 5,000 $h^{-1}$ and advantageously from about 500 to 2 000 $h^{-1}$. This treatment under gas scavenging usually lasts from about ½ to 24 hours, and preferably from about ½ to about 10 hours, and more preferably about 2 hours.

Another advantageous embodiment of this thermal treatment comprises performing a first part of said step in an inert gas stream substantially free of steam (e.g., containing less than 5% by weight, and preferably less than 1% by weight of steam) usually selected from the group formed of nitrogen, argon, helium and a mixture of two or more of these gases, at a temperature and for a time selected within the above-mentioned ranges, and then performing a second part of said step in the presence of an inert gas containing steam (usually at least 25% by weight, preferably at least 50% by weight and advantageously 100% by weight) in the above-mentioned conditions.

After thermal treatment under gas scavenging (step d), the absorption mass may optionally be dried, preferably in a stream of inert gas, for example of nitrogen, helium, argon or a mixture of two or more of these gases, then optionally cooled to room temperature, preferably in the presence of a stream of the above-mentioned gas, before being contacted with the fluid to purify.

The weight of copper sulfide, expressed as copper, contained in the mass is usually from about 2 to 65%, preferably from 5 to 50% of the mass weight. Advantageously, the copper sulfide content of the mass, expressed as copper, amounts to about 10 to 50% or 20-50% by weight of the mass. Preferred masses are usually those having at least 30%, and preferably at least 80% of their copper content present as the sulfide.

The mercury recovery masses obtained by the process of the invention may be used to purify mercury-containing gases or liquids. The solid masses are generally used as fixed beds through which the fluid passes to purify.

The recovery masses are efficient in a temperature range usually from about −50° C. to +200° C. When recovering mercury from air, it is however preferable to operate at a temperature lower than about 100° C. The mercury recovery may be performed under atmospheric pressure or under a lower or a higher pressure, the total pressure being optionally as high as 20 MPa. The VVH for gas charges (charge volume per volume of recovery mass and per hour) is usually from about 500 to 5 000 $h^{-1}$, preferably from about 2000 to 20,000 $h^{-1}$, and advantageously from about 4000 to 20,000 $h^{-1}$; for liquid charges, the VVH will be preferably from about 0.1 to 50 $h^{-1}$.

The treated fluids may contain, for example, from 10 nanograms to 2 grams of mercury or more per cubic meter. The treated gases are mostly hydrocarbons or hydrocarbon mixture such as natural gases containing a major proportion of methane and a minor proportion of $C_2^+$ hydrocarbons and of mercury.

The treated gas may consist of hydrogen, for example electrolytic hydrogen; it may also consist of air, provided that the temperature and/or pressure operating conditions are such that contact with said gas does not result in the oxidation of the absorption mass or of an excessive part thereof. Mixtures containing several of the above-mentioned compounds or gases may also be treated.

The treated gases are mostly mixtures of hydrocarbons generally containing a major proportion of $C_5$-$C_{10}$ saturated hydrocarbons and a minor proportion of $C_{10}^+$ hydrocarbons and of mercury.

All the devices known in the art for fluid purification may be used. The device for mercury removal may comprise, for example, a single reactor or at least two reactors in parallel but it is preferred to use at least two reactors in series.

When using three reactors A, B, C in series, the operation will be preferably conducted as follows: When the first reactor A reaches a recovery efficiency corresponding, for example, to 90% or 70% of its initial efficiency, the recovery mass contained in A is regenerated or replaced. During the time required for this regeneration or replacement, the fluid passes through reactors B and C. After regeneration or replacement of the recovery mass of A, the fluid will pass through B and C and then through A. The recovery mass of reactor B is regenerated or replaced when its efficiency decreases for example, to 90% or 70% of its initial efficiency, and the fluid then passes through C and A during this operation. After regeneration or replacement of the recovery mass in B, the fluid passes through C and A and then through B. The recovery mass in C is then regenerated or replaced and so on.

The present invention also concerns a process for regenerating a solid mercury absorption mass containing an inorganic carrier and copper at least partly as a sulfide.

More particularly, the invention concerns a process for regenerating solid mercury absorption masses used for removing mercury from a fluid (gas or liquid).

The absorption masses to be regenerated by the process of the invention are, for example, prepared according to the abovedescribed process or by any other method of the art.

U.S. Pat. No. 4,094,777 discloses a process for regenerating mercury absorption solid masses by heating an absorption mass whose efficiency has been reduced for example to 70% of its initial efficiency, under scavenging with an oxidizing, neutral or reducing gas, for example air, methane or hydrogen, for 0.1 to 48 hours, at a temperature from 200° to 500° C. If necessary, this heating step is followed with a resulfurization of the obtained mass by means of a sulfurizing gaseous agent such as hydrogen sulfide, or by means of a solution of sulfide in water or in an organic solvent, for example an aqueous solution of sodium sulfide, potassium sulfide or ammonium sulfide.

The regeneration technique disclosed in U.S. Pat. No. 4,094,777 does not restore to a sufficient extent the mercury absorption efficiency of the treated solid masses.

Moreover, as above stated, the sulfurization by means of hydrogen sulfide ($H_2S$) usually requires relatively high operating temperatures, sometimes higher than 200° C. In addition, this product is toxic and malodorous and the sulfurization usually requires several hours, sometimes even several days.

The use of sulfide solutions, particularly aqueous sulfide solutions, for example aqueous solutions of ammonium sulfide, is usually compatible with relatively low operating temperatures, for example lower than 100° C. However, ammonium sulfide is also toxic and easily decomposable, which makes it difficult to use.

A process for regenerating mercury absorption solid masses has been discovered, this being one of the objects of the present invention, which does not suffer from the disadvantages of the process disclosed in U.S. Pat. No. 4,094,777 and which provides for substantial restoration of the mercury absorption efficiency of said masses.

The absorption masses regenerated by the process of the invention, as hereinafter described allows for recovery of mercury absorption efficiency substantially very close to that of a fresh mass, i.e., of a mass not yet contacted with a mercury-containing liquid or gas.

In order to be efficient for recovering mercury contained in a gas or in a liquid, the absorption mass must contain copper sulfide.

The amount of copper sulfide contained in the absorption mass, expressed as copper, usually amounts to 2–65%, and preferably about 5–50% of the mass weight. Advantageously, the copper sulfide content of the masses, expressed as copper, amounts to about 10–50%, and preferably about 20–50% of said weight. Preferred masses are those having at least 30%, and preferably at least 80% of their copper content present as sulfide.

The copper sulfide-containing mercury recovery masses have a recovery efficiency which varies over time as they collect the mercury contained in the fluid contacted therewith.

Accordingly, the collecting efficiency of the mass decreases over time and it becomes necessary either to use a fresh mass or to regenerate the solid mass whose collecting efficiency has become insufficient. For example, the regeneration is performed when the collecting efficiency has decreased to 40–99.8%, preferably 50–99.5% and more preferably 70–99% of its initial activity.

As a matter of fact, it is necessary for industrial operation to maintain a very high mercury collecting efficiency of said masses in order to comply with the industrial specifications of mercury content for the treated fluid. These specifications are usually prescribed by the users of the treated fluids, of example by the refiner for hydrocarbons, mostly to limit the mercury content to less than about 5 to 100 nanograms per fluid cubic meter.

Those skilled in the art will know when the absorption mass will have to be regenerated, in relation to the desired parameters on the site of treatment or on the site of use of the treated fluids.

It may also happen that the collecting efficiency decreases substantially, sometimes quickly, for example when said masses are contacted with an oxidizing atmosphere, for example when, as a result of an unintentional modification of the contact conditions, an exothermic reaction takes place, resulting in quick degradation of the collecting efficiency of said mass.

Consequently, the solid masses, wherein at least a part of the copper is present as oxides, lose most or even all of their collecting efficiency without having absorbed any mercury at all.

These masses, whose demercurization efficiency is considered as insufficient by those skilled in the art, must then be regenerated.

The regeneration process of the present invention comprises contacting the absorption mass having lost at least some of its mercury collecting efficiency, previously freed of the major part of its mercury content, with at least one sulfurizing agent, so as to at least partially incorporate said agent with the absorption mass, preferably at least partly in its pores, said sulfurization agent being an organic polysulfide of general formula:

$$R\text{-}S_{(n)}\text{-}R'$$

wherein n is an integer from 2 to 20, preferably from 3 to 20, usually from 3 to 8 and more particularly from 4 to 7, and each of R and R', identical or different, is an organic radical containing 1 to 150, preferably 10 to 60, usually 5 to 40 and more particularly 7 to 16 carbon atoms, these radicals being usually selected from the group consisting of saturated or unsaturated, linear or branched alkyl radicals or radicals of the naphthenic type, aryl radicals, alkylaryl radicals and arylalkyl radicals, these various radicals optionally comprising at least one heteroatom, R optionally also being a hydrogen atom.

The incorporation with the organic polysulfide is usually conducted at a temperature lower than 100° C., generally of about 0°–50° C. and preferably from 10° to 35° C., for example at room temperature (usually about 20° C. or 15°–25° C.). The polysulfide is generally used as solution in a suitable organic solvent, selected in accordance with its nature. This solvent may be an ether, an ester, a ketone, a hydrocarbon or a mixture of two or more of these compounds.

Generally, a hydrocarbon or hydrocarbon mixture is used, such as:
- a light gasoline boiling for example at about between 60° and 95° C.,
- a hexane gasoline boiling at about between 63° and 68° C.
- an F gasoline boiling at about between 100° and 160° C. and usually containing 10 to 20%, for example 15%, by volume of aromatic hydrocarbons,
- a "white spirit" gasoline, boiling at about between 150° and 250° C. and usually containing 14 to 22%, for example 17% by volume of aromatic hydrocarbons, or
- any hydrocarbon or non-hydrocarbon cut equivalent to the preceding gasolines.

A preferred example of organic polysulfide is ditert-do-decylpolysulfide (n=5) wherein each R and R' is a dodecyl radical.

This product is sold by Elf Aquitaine Company under reference TPS 32, in view of its 32% sulfur content.

Another example of organic polysulfide is ditert-nonylpolysulfide (n=5), wherein each of R and R' is a nonyl radical.

This product is sold by Elf Aquitaine Company under reference TPS 37, in view of its 37% sulfur content, and by PENWALT Company under reference TNPS.

Depending on the operating conditions, these organic polysulfide-type sulfurization agents may be used alone or admixed with one another in selected judicious proportions.

The amount of polysulfide into to be incorporated to the absorption mass is selected in view of the at least partial subsequent conversion of the copper compounds contained in said mass to copper sulfide. The amount of polysulfide may be easily adjusted so as to obtain the desired amount of copper sulfide.

It is usually desirable to completely convert the copper compounds of the absorption mass to copper sulfide and hence to use polysulfide in a substantially stoichiometrical amount with respect to copper or to the copper and silver assembly, calculated as metal atoms. The organic polysulfide amount, calculated as sulfur atoms, is advantageously such that the atomic ratio of sulfur to the metals present in the mass be from about 0.7:1 to 1.2:1, preferably from about 0.8:1 to 1.1:1.

The step of incorporating the organic polysulfide with the absorption mass is preferably followed with a treatment in a non-oxidizing, for example neutral or reducing, preferably neutral, atmosphere, under gas scavenging, at a sufficient temperature and for a sufficient time to form the sulfide of the one or more present metals. This treatment is usually performed under a stream of inert gas, for example of nitrogen, argon, helium, steam or a mixture of two or more of these gases.

In a preferred embodiment of this thermal treatment under gas scavenging, a gas containing water stream and at least one other inert gas, such as nitrogen, argon and helium, is used. The steam content of the gas mixture is then advantageously at least 50% by weight. It is often preferably to use steam alone, not diluted with another inert gas.

Thus, in an advantageous embodiment of this treatment, the absorption mass containing the organic polysulfide is treated in a gas stream preferably containing steam, at a temperature from about 100° to about 250° C., preferably about 110°–180° C. and usually about 120°–150° C., with an hourly space velocity (VVH), expressed as gas volume per volume of collecting mass and per hour, from about 100 to 10,000 h$^{-1}$, preferably from about 300 to 5000 h$^{-1}$ and usually about from 500 to 2000 h$^{-1}$. This treatment under gas scavenging usually lasts about from ½ to 24 hours, preferably from about ½ to 10 hours and more preferably about 2 hours.

Another advantageous embodiment of this thermal treatment comprises performing a first part of said thermal treatment step in a stream of inert gas substantially free of steam (e.g., of steam content lower than 5%, preferably lower than 1% by weight), usually selected from the group formed of nitrogen, argon, helium and a mixture of two or more of said gases, at a temperature and for a time selected within the above-mentioned ranges, and then performing a second part of said thermal treatment step in the presence of an inert gas containing steam (in a proportion of at least 25%, preferably at least 50% and advantageously 100% by weight) under the above-mentioned conditions.

After the treatment under gas scavenging, the absorption mass may optionally be dried, preferably in inert gas stream, for example of nitrogen, helium, argon or a mixture of said gases, then optionally cooled to room temperature, preferably in the presence of the above-mentioned gas stream, before being again contacted with the fluid to purify.

Before being contacted with at least one sulfurization agent selected from the group formed of the above-mentionned organic sulfurization agents (polysulfides), the absorption mass is previously freed from at least a part of its mercury content by any well-known means of the art. This mercury removal may be advantageously performed by thermal treatment in an oxidizing atmosphere, for example air or a mixture of oxygen with inert gas containing, for example, 1–60% by weight of oxygen. Air of increased oxygen content may also be used, but for practical reasons air is advantageously used.

This treatment in an oxidizing atmosphere is usually performed at a temperature of from about 300° to 800° C., and preferably about 400° to 600° C. This treatment results in the mercury recovery and gives an absorption solid mass preferably freed of at least most and preferably all mercury. As a result of this treatment, the absorption mass is converted to a mass which is inactive for mercury absorption, particularly as a consequence of the at least partial conversion of copper to copper oxide (CuO), inactive for mercury recovery.

The obtained inactive mass may however be easily regenerated by the process of the invention.

The present invention has also as an object a process for removing mercury contained in a fluid (gas or liquid) comprising the following successive steps:

(a) a first step wherein a collecting mass containing a solid carrier or dispersing agent, preferably selected from the group formed of silica, alumina, silica-alumina, silicates, aluminates, and silico-aluminates, and containing copper at least partly as sulfide, is contacted, in conditions adapted for mercury collection, with a charge of said fluid, said contact being maintained until said collecting mass has lost, at least partly, its mercury collecting efficiency, (b) a second step wherein the collecting mass from step (a) is regenerated according to the process of the invention, as described above and, (c) a third step wherein the regenerated collecting mass from step (b) is contacted with a new fluid charge under conditions of mercury collection.

The described cycle thus comprises a mercury collection period, a regeneration period and then a new mercury collection period may be repeated several times., which The absorption masses are preferably used as a fixed bed through which the gas or liquid passes to purify.

It has been observed that masses having an average pore diameter of at least about 100 Angstrooms were more stable in the presence of charges containing condensable hydrocarbons (of 4 carbon atoms or more in the molecule).

The absorption masses are regenerated according to the invention preferably in a unit specially designed for performing said regeneration. It is possible, however, to regenerate the collecting mass in the reactor used for the fluid treatment.

EXAMPLES

The following examples are given to illustrate the invention and must not be considered as limiting the scope thereof.

EXAMPLE 1 (comparative)

1 kg of alumina balls of 50 $m^2.g^{-1}$ specific surface and 1.2 $cc.g^{-1}$ pore volume is impregnated with 1.2 l of aqueous solution containing 770 g off trihydrated copper nitrate $Cu(NO_3)_2$, $3H_2O$.

The impregnated alumina balls are dried and roasted for 7 hours at 430° C. in an air stream at a VVH of 5 000 $h^{-1}$. The obtained balls are impregnated in a bowl granulator, in a second step, by means of 1 liter of aqueous solution containing 20% by weight of ammonium sulfide. The sulfur excess is removed by drying in a stove at 150° C. for 18 hours under nitrogen stream (VVH of 5 000 $h^{-1}$).

The obtained mass A contains copper sulfide in an amount, expressed as copper, of 20% by weight. The X-ray diffraction analysis indicates that all the copper is present as copper sulfide.

EXAMPLE 2 (compatative)

1 kg of alumina balls of 50 $m^2.g^{-1}$ specific surface and of 1.2 $cc.g^{-1}$ pore volume is impregnated with 1.2 l of aqueous solution containing 490 g of precipitated copper carbonate $2CuCO_3$, $Cu(OH)_2$.

The impregnated alumina balls are dried and roasted for 7 hours at 430° C. in an air stream at a VVH of 5 000 $n^{-1}$. The obtained balls, in a second step, are impregnated in a bowl granulator by means of 1 liter of aqueous solution containing 20% by weight of sodium sulfide. The sulfur excess is removed by drying in a stove at 150° C. for 18 hours in a nitrogen stream (VVH of 5 000 $h^{-1}$).

The obtained mass B contains copper sulfide in an amount, expressed as copper, of 20% by weight. The X-ray diffraction analysis indicates that all the copper is present as copper sulfide.

EXAMPLE 3

1 kg of alumina balls of 50 $m^2.g^{-1}$ specific surface and of 1.2 $cc.g^{-1}$ pore volume is impregnated with 1.2 l of aqueous solution containing 770 g of trihydrated copper nitrate. The impregnated alumina balls are dried and roasted for 7 hours at 430° C. in air stream at a VVH of 5 000 $h^{-1}$.

The obtained roasted balls are impregnated in a bowl granulator, at a temperature of 20° C., with 0.86 l of a 30% by weight solution in "White Spirit" of ditert-nonylpolysulfide (product sold by Elf Aquitaine Company under reference TPS 37). The solution is used in a volume amount corresponding to the impregnation volume of the treated mass, so that the polysulfide is completely absorbed in said mass.

The obtained product is dried at 150° C. for 16 hours under nitrogen stream (VVH=5 000 $h^{-1}$) and then treated (activated) for 2 hours under steam circulating at a temperature of 130°-150° C., with a VVH of 1 000 $h^{-1}$.

The obtained mass C is then dried under nitrogen stream (VVH=5 000 $h^{-1}$) before being tested for demercurization.

The X-ray diffraction analysis indicates that all the copper is present as copper sulfide. The copper sulfide content of the mass, expressed as copper, is 20% by weight.

EXAMPLE 4

1 kg of alumina balls of 50 $m^2.g^{-1}$ specific surface and of 1.2 $cc.g^{-1}$ pore volume is impregnated with 1.2 l of aqueous solution containing 770 g of trihydrated copper nitrate. The impregnated alumina balls are dried and roasted for 7 hours at 430° C. in air stream at a VVH of 5 000 $h^{-1}$.

The obtained roasted balls are impregnated in a bowl granulator at a temperature of 20° C. with 0.90 l of a 30% by weight solution in "White Spirit" of ditert-dodecylpolysylfide (product sold by Elf Aquitaine Company under reference TPS 32). The solution is used in a volume amount corresponding to the impregnation volume of the treated mass, so that the polysulfide is completely absorbed in said mass.

The obtained product is dried at 150° C. for 16 hours under nitrogen stream (VVH=5 000 $h^{-1}$) and then treated (activated) for 2 hours under stream at a temperature of 130°-150° C., circulating at a VVH of 1 000 $h^{-1}$.

The obtained mass D is then dried under nitrogen stream (VVH=5 000 $h^{-1}$) before being tested for demercurization.

The X-ray diffraction analysis indicates that all the copper is present as copper sulfide. The copper sulfide content of the mass, expressed as copper, is 20% by weight.

EXAMPLE 5

A mass E is prepared as above described in example 3, from the same alumina balls. The preparation process is identical in all respects except that the alumina balls are impregnated with a solution containing 760 g of trihydrated copper nitrate and 7 g of silver nitrate. The X-ray diffraction analysis shows that all the copper and all the silver of mass E are present as sulfide.

EXAMPLE 6

A mass F is prepared as above described in example 3, from the same alumina balls. The preparation process is identical in all respects except that the alumina balls are impregnated with an aqueous solution containing 490 g of precipitated copper carbonate 2 $CuCO_3$, $Cu(OH)_2$.

The X-ray diffraction analysis shows that all the copper is present as copper sulfide. The copper sulfide content of the mass, expressed as copper, is 20% by weight.

EXAMPLE 7

A mass G is prepared as described in example 4, from the same alumina balls. The preparation process is identical in all respects except that the alumina balls are impregnated with an aqueous solution containing 490 g of precipitated copper carbonate 2 $CuCO_3$, $Cu(OH)_2$.

The X-ray diffraction analysis shows that all the copper is present as copper sulfide. The copper sulfide content of the mass, expressed as copper, is 20% by weight.

EXAMPLE 8

A mass H is prepared as above described in example 3, from the same alumina balls. The preparation process is identical in all respects except that the alumina balls are impregnated with a solution containing 480 g of precipitated copper carbonate 2 CuCO$_3$, Cu(OH)$_2$ and 7 g of silver nitrate.

The X-ray diffraction analysis shows that all the copper and all the silver of mass H are present as sulfide.

EXAMPLE 9

The mercury collecting masses A to H obtained in the preceding examples are tested in the following conditions.

The apparatus consists of a tubular reactor of metal proved as inactive for mercury fixation. 30 ml of the collecting mass to be tested are introduced in said reactor wherethrough a stream of mercury-containing natural gas is passed at a temperature of 70° C., under a pressure of 35 bars (3.5 MPa), at a VVH of 15 000 h$^{-1}$ (NTP, normal temperature and pressure), i.e. at a flow rate of 450 l.h$^{-1}$.

The natural gas to be purified contains by volume 84% of CH$_4$, 0.6% of hydrocarbons having at least 5 carbon atoms in their molecule, the remainder consisting of a mixture of N$_2$, CO$_2$, C$_2$H$_4$, C$_3$H$_8$ and C$_4$H$_{10}$. The mercury content of the gas at the reactor inlet is 2.10$^{-5}$ g/m$^3$ (NTP).

The mercury amount remaining in the gases after purification is estimated by a method using the principle of the resistivity variation of a gold film amalgamated by mercury.

The efficiency of the recovery masses is defined by the following relationship:

$$E\% = \frac{\text{(mercury content at inlet)} - \text{(mercury content at outlet)}}{\text{(mercury content at inlet)}} \cdot 100$$

The so-called "initial" efficiency is determined after one hour of operation in the above-described conditions.

A measurement is then performed after 500 hours of operation in the above-described conditions.

In order to better estimate the life time or the time during which the recovery masses efficiency is maintained, an accelerated ageing test is performed in the following conditions:

After 500 hours of mercury recovery in the above-described conditions, a gas having an identical composition but containing 20 mg/m$^3$ (NTP) of mercury is passed over the recovery mass for 200 hours (this being equivalent to 200 000 hours of operation in the above-mentioned conditions with a gas containing 2.10$^{-5}$ g/m$^3$ of mercury). After these 200 hours, a gas containing 2.10$^{-5}$ g/m$^3$ of mercury, of identical composition as that indicated above, is again passed, in the above-specified conditions, over the mass, whose efficiency is measured after one hour of operation in said conditions.

The results are given in tables 1 and 2 hereinafter: they show that masses C, D, E and F, G, H respectively obtained by the process of the invention have a very good efficiency and also that said activity is better maintained during time than that of mass A or of mass B (A and B illustrating the prior art). The mercury collecting efficiency at the end of the accelerated ageing test is higher for masses C, D, E and F, G, H respectively than for mass A or for mass B.

TABLE I

| | EFFICIENCY % | | |
|---|---|---|---|
| mass | initial at 1 h 2.10$^{-5}$ g/m$^3$ Hg | at 500 h 2.10$^{-5}$ g/m$^3$ Hg | at 200 h 2.10$^{-2}$ g/m$^3$ Hg |
| A | 99.9 | 99.9 | 98.3 |
| C | 99.9 | 99.9 | 99.5 |
| D | 99.9 | 99.9 | 99.5 |
| E | 99.9 | 99.9 | 99.6 |

TABLE 2

| | EFFICIENCY % | | |
|---|---|---|---|
| mass | initial at 1 h 2.10$^{-5}$ g/m$^3$ Hg | at 500 h 2.10$^{-5}$ g/m$^3$ Hg | at 200 h 2.10$^{-2}$ g/m$^3$ Hg |
| B | 99.8 | 99.8 | 98.2 |
| F | 99.8 | 99.8 | 99.5 |
| G | 99.8 | 99.8 | 99.4 |
| H | 99.8 | 99.8 | 99.6 |

EXAMPLE 10

30 ml of mass A prepared according to the method described in example 1, are placed into a reactor, made of metal inert with respect to mercury fixation, wherethrough a mercury-containing natural gas stream is passed at a temperature of 70° C. under a pressure of 35 bars (3.5 MPa) at a VVH of 15 000 h$^{-1}$ (NTP), i.e. at a flow rate of 450 l/h. The natural gas to purify contains by volume 84% of CH$_4$, 0.6% of hydrocarbons having at least 5 carbon atoms in their molecule, the remainder consisting of a mixture of N$_2$, CO$_2$, C$_2$H$_4$, C$_3$H$_8$ and C$_4$H$_{10}$. The mercury content of the gas at the reactor inlet is 2.10$^{-5}$ g/m$^3$ (NTP).

The mercury amount remaining in the gases after purification is estimated by a method using the principle of the resistivity variation of a gold film amalgamated by mercury.

The efficiency of the recovery masses is defined by the following relationship:

$$E\% = \frac{\text{(mercury content at inlet)} - \text{(mercury content at outlet)}}{\text{(mercury content at inlet)}} \times 100$$

The so-called "initial" efficiency is determined after one hour of operation in the above-described conditions.

The deactivation rate versus time is determined after 500 hours of operation in the above-described conditions. An accelerated ageing test is also performed as follows: after 500 hours of mercury recovery in the above-described conditions, a gas of identical composition but containing 20 mg/m$^3$ of mercury is passed over the mass during 200 hours (this being equivalent to 200 000 hours of operation in the above-mentioned conditions with a gas containing 2.10$^{-5}$ g/m$^3$ of mercury).

After these 200 hours, a gas containing 2.10$^{-5}$ g/m$^3$ of mercury, of identical composition as that indicated above is again passed in the above-specified conditions over the mass, whose efficiency is measured after one hour of operation in said conditions.

The results are given in table 3 hereinafter. The retained mercury is then removed from the deactivated mass by heating at 500° C., under a stream of dry air, at a flow rate of 100 l/h, for 4 hours. The mass I resulting from this treatment no longer contains either sulfur or mercury and has no efficiency for mercury recovery.

EXAMPLE 11

30 ml of mass A prepared by the method described in example 1 are placed in a reactor identical to that described in example 10, wherethrough a stream of dry air (polluted with mercury) at a temperature of 70° C., is passed under a pressure of 35 bars (3.5 MPa) at a VVH of 15 000 h$^{-1}$. The dry air to purify contains $2.10^{-5}$ g/m$^3$ of mercury.

During the mercury collecting operation, after 100 hours of run, it appears that the mass is involved in an exothermic reaction accompanied with a substantial SO$_2$ release, resulting in a very substantial deactivation of the collecting mass. The results are expressed in terms of efficiency after 1 hour and 110 hours of operation, in table 4. After this incident, the recovery of mercury contained in air is discontinued and the deactivated mass is heated at 500° C. under a 100 l/h stream of dry air for 4 hours. The mass J resulting from this treatment no longer contains sulfur or mercury. It has no efficiency for mercury recovery.

EXAMPLE 12 (comparative)

A mass I, obtained according to the process described in example 10, is regenerated according to one of the methods recommended in the prior art, by means of a H$_2$S stream (VVH of 10 000 h$^{-1}$) for 5 hours at 280° C., under atmospheric pressure.

The so-regenerated mass, called mass K, is tested in the same conditions as described in example 10.

The results are reported in table 5 hereinafter. The test is discontinued after 500 hours, the mass efficiency for industrial operation being insufficient.

EXAMPLE 13 (comparative)

A mass I, obtained according to the process described in example 10, is regenerated according to a process identical to that described for the preparation of mass A, i.e by impregnation with an ammonium sulfide aqueous solution.

The so-regenerated mass, called mass L, is tested in the same conditions as described in example 10.

The results are reported in table 5 hereinafter. The test is discontinued after 500 hours, the mass efficiency being insufficient for industrial operation.

EXAMPLE 14 (comparative)

A mass I, obtained according to the process described in example 10, is regenerated by impregnation with a 20% by weight sodium sulfide aqueous solution.

The so-regenerated mass, called mass M, is tested in the same conditions as described in example 10.

The results are reported in table 5 hereinafter. The test is discontinued after 500 hours, the mass efficiency being insufficient for industrial operation.

EXAMPLE 15 (comparative)

A mass J, obtained according to the process of example 11, is regenerated according to the method described in example 12. The so-regenerated mass, called mass N, is tested in the same conditions as those mentioned in example 11. The test is continued without difficulty for 260 hours.

The results are reported in table 6 hereinafter.

EXAMPLE 16 (comparative)

A mass J, obtained according to the process of example 11, is regenerated according to the method described in example 13. The so-regenerated mass, called mass O, is tested in the same conditions as those mentioned in example 11. The test is continued without difficulty for 260 hours.

The results are reported in table 6 hereinafter.

EXAMPLE 17 (comparative)

A mass J, obtained according to the process of example 11, is regenerated according to the method described in example 14. The so-regenerated mass, called mass P, is tested in the same conditions as those mentioned in example 11. The test is continued without difficulty for 260 hours.

The results are reported in table 6 hereinafter.

EXAMPLE 18

100 g of a mass I (obtained according to the process described in example 10), inactive for mercury removal, are regenerated by impregnation in a bowl granulator by means of 86 ml of a 30% by weight solution in "White Spirit" of ditert-nonylpolysulfide (product sold by Elf Aquitaine Company under reference TPS 37). In order to absorb the totality of the polysulfide, the reactant total volume (polysulfide+polysulfide solvent) is equal to the impregnation volume of the treated mass. This operation, conducted at room temperature (20° C.) is followed with a drying step at 150° C. for 16 hours under nitrogen stream (VVH=5,000 h$^{-1}$) and then with an activation for 2 hours under steam at 130°-150° C. circulating at a VVH of 1,000 h$^{-1}$. The soactivated mass, called mass Q, is then dried under nitrogen (VVH=5,000 h$^{-1}$) and tested for demercurization in the conditions described in example 10.

The results are given in table 5 hereinafter.

EXAMPLE 19

100 g of a mass I (obtained according to the process described in example 10), inactive for mercury removal, are regenerated by impregnation in a bowl granulator by means of 90 ml of a 30% solution in "White Spirit" of ditert-dodecylpolysulfide (product sold by Elf Aquitaine Company under reference TPS 32). In order to completely absorb the polysulfide, the reactant total volume (polysulfide+polysulfide solvent) is equal to the impregnation volume of the treated mass. This operation, conducted at room temperature (20° C.) is followed with a drying step at 150° C. for 16 hours in nitrogen stream (VVH=5,000 h$^{-1}$) and then activated for 2 hours under steam at 130°-150° C. circulating at a VVH of 1000 h$^{-1}$. The so-activated mass, called mass R, is then dried under nitrogen (VVH=5,000 h$^{-1}$) and tested for demercurization in the conditions described in example 10.

The results are given in table 5 hereinafter.

EXAMPLE 20

100 g of a mass J, obtained according to the process of example 11, are regenerated according to the technique described in example 18. The so-regenerated mass, called mass S, is tested in the same conditions as those mentioned in example 11. The test is continued without difficulty for 260 hours.

The results are reported in table 6 hereinafter.

EXAMPLE 21

100 g of a mass J, obtained according to the process of example 11, are regenerated according to the technique described in example 19. The so-regenerated mass, called mass T, is tested in the same conditions as those mentioned in example 11. The test is continued without difficulty for 260 hours.

The results are reported in table 6 hereinafter.

TABLE 3

| mass | EFFICIENCY % | | |
|---|---|---|---|
| | initial at 1 h $2.10^{-5}$ g/m$^3$ Hg | at 500 h $2.10^{-5}$ g/m$^3$ Hg | at 200 h $2.10^{-2}$ g/m$^3$ Hg |
| A | 99.9 | 99.9 | 98.3 |
| I | 0 | — | — |

TABLE 4

| mass | EFFICIENCY % | |
|---|---|---|
| | initial at 1 h $2.10^{-5}$ g/m$^3$ Hg | at 110 h $2.10^{-5}$ g/m$^3$ Hg |
| A | 99.9 | 45.5 |
| J | 0 | — |

TABLE 5

| mass | EFFICIENCY % | | |
|---|---|---|---|
| | initial at 1 h $2.10^{-5}$ g/m$^3$ Hg | at 500 h $2.10^{-5}$ g/m$^3$ Hg | at 200 h $2.10^{-2}$ g/m$^3$ Hg |
| K | 99.1 | 97.3 | — |
| L | 99.3 | 98.7 | — |
| M | 99.2 | 98.4 | — |
| Q | 99.8 | 99.8 | 98.2 |
| R | 99.7 | 99.7 | 98.2 |

TABLE 6

| mass | EFFICIENCY % | |
|---|---|---|
| | initial at 1 h $2.10^{-5}$ g/m$^3$ Hg | at 260 h $2.10^{-5}$ g/m$^3$ Hg |
| N | 98.3 | 97.5 |
| O | 98.5 | 98.0 |
| P | 98.5 | 97.8 |
| S | 99.7 | 99.7 |
| T | 99.7 | 99.7 |

By comparison of the results reported in tables 5 and 6, it appears that masses Q, R, S and T, obtained after regeneration according to the invention, have recovered an efficiency almost equal to that of the fresh mass (mass A).

Moreover, the efficiency of masses K, L and M, obtained by regeneration of mass I according to prior art methods, is lower than that of masses Q and R, obtained by regeneration of mass I according to the present invention. Similarly the efficiency of masses N, O and P, regenerated from mass J according to the prior art techniques, is lower than that of masses E and F, obtained by regeneration of mass J according to the present invention. Furthermore, after 500 hours of run, the efficiency of masses K, L and M is insufficient for industrial operation, whereas masses Q and R have kept their initial efficiency.

After 260 hours, the efficiency of masses N, O and P has become insufficient for industrial operation, whereas masses S and T have hept their initial efficiency.

What is claimed as the invention is:

1. A process for preparing a mercury recovery solid mass comprising a solid inorganic carrier and copper, at least partly as copper sulfide, characterized in that it comprises the steps of:

(a) incorporating at least one copper compound other than a sulfide with a solid inorganic carrier or dispersing agent, (b) optionally roasting the product obtained in step (a) so as to convert at least partly the one or more copper compounds contained therein to copper oxide, (c) incorporating with the resultant product from step (b) or from step (a) at least one organic polysulfide of formula R-S$_{(n)}$-R', wherein n is an integer from 2 to 20, R is a hydrogen atom or an organic radical containing 1-150, carbon atoms, selected from the group consisting of saturated or unsaturated, linear or branched alkyl radicals, naphthenic radicals, aryl radicals, alkylaryl and arylalkyl radicals, and R' is an organic radical, identical to or different from R, having 1-150 carbon atoms, selected from the group of the organic radicals defined for R, and (d) subjecting the resultant precursor product from step (c) to a thermal treatment in non-oxidizing atmosphere, under gas scavenging conditions, at a sufficient temperature and for a sufficient time to form copper sulfide.

2. A process according to claim 1, wherein the solid inorganic carrier is selected from the group consisting of coal, active carbon, coke, silica, aluminas, silica-aluminas, silicates, aluminates and silico-aluminates.

3. A process according to claim 2, wherein, during step (a), an aqueous solution of copper nitrate is used.

4. A process according to claim 3, wherein, during step (b), the product resulting from step (a) is roasted at a temperature from 200° to 1,000° C., under a gas stream at a VVH from about 0 to about 20,000 h$^{-1}$, for about 0.5-24 hours.

5. A process according to claim 4, wherein, during step (c), the organic polysulfide is incorporated with the product resulting from step (b) or from step (a), at a temperature lower than about 100° C.

6. A process according to claim 5, wherein during step (c), the organic polysulfide is used as a solution in an organic solvent selected from the group formed of a light gasoline boiling in the range of about 60°-95° C., a hexane gasoline boiling in the range of about 63°-68° C., a gasoline boiling in the range of about 100° to 160° C. containing 10-20% by volume of aromatic hydrocarbons and a gasoline, boiling in the range of about 100°-250° C. containing 14-22% by volume of aromatic hydrocarbons.

7. A process according to claim 6, wherein the organic polysulfide is selected from the group consisting of ditert-dodecylpolysulfide and ditert-nonylpolysulfide.

8. A process according to claim 7, wherein the organic polysulfide is used in such an amount, calculated as sulfur atoms, that the atomic ratio of sulfur to the metal present in the mass be about from 0.7:1 to 1.2:1.

9. A process according to claim 8, further comprising the incorporation during step (a) of a silver compound.

10. A process according to claim 9, wherein the copper sulfide content of the recovery solid mass, calculated as copper, amounts to about 2-65% by weight.

11. A process for preparing a mercury recovery solid mass according to claim 8, wherein the organic polysulfide is incorporated with the solid inorganic carrier after step (b).

12. A process according to claim 1, wherein in step (b) at least 50% of the copper compound is converted to copper sulfide.

13. A process according to claim 1, wherein the copper sulfide content of the recovery mass is 2–65% by weight, calculated as copper, of the mass.

14. A process according to claim 1, wherein at least 30% of the copper present in the recovery mass is present as copper sulfide.

15. A process for the preparation of a mass useful in mercury recovery, comprising subjecting a product containing an inorganic carrier, copper oxide, and at least one organic polysulfide of the formula R-S$_{(n)}$-R', wherein n is 2–20, R is hydrogen or an organic radical containing 1–150 carbon atoms selected from the group consisting of saturated or unsaturated, linear or branched alkyl radicals, naphthenic radicals, aryl radicals, alkylaryl and arylalkyl radicals, and R' is an organic radical, identical to or different from R, having 1–50 carbon atoms, selected from the group of the organic radicals defined for R, to a thermal treatment in a non-oxidizing atmosphere, under gas scavenging conditions, at a sufficient temperature and for a sufficient time to form copper sulfide.

* * * * *

UNITED STATES PATENT AND TRADEMARK OFFICE
CERTIFICATE OF CORRECTION

PATENT NO. : 4,902,662

DATED : February 20, 1990

INVENTOR(S) : HERVE TOULHOAT ET AL

It is certified that error appears in the above-identified patent and that said Letters Patent is hereby corrected as shown below:

Column 20, claim 15, line 6:

reads "1-50 carbon atoms, selected from the group of the or-"

should read -- 1-150 carbon atoms, selected from the group of the or- --

Signed and Sealed this

Twenty-eighth Day of August, 1990

Attest:

HARRY F. MANBECK, JR.

Attesting Officer

Commissioner of Patents and Trademarks